United States Patent [19]
Chern

[11] Patent Number: 5,089,836
[45] Date of Patent: Feb. 18, 1992

[54] REMOTE CONTROL SHUTTER DEVICE FOR A CAMERA

[76] Inventor: Ming J. Chern, No. 10-1, Alley 2, Lane 290, Hsien Cheng Rd., Ling Ya District, Kaohsiung City, Taiwan

[21] Appl. No.: 687,297

[22] Filed: Apr. 18, 1991

[51] Int. Cl.⁵ ............................................. G03B 17/38
[52] U.S. Cl. ..................................... 354/266; 354/295
[58] Field of Search ............................... 354/266-269, 354/131, 295

[56] References Cited

U.S. PATENT DOCUMENTS 4,592,635 6/1986 Vaughn ............................ 354/266
4,801,959 1/1989 Chern ............................... 354/266

*Primary Examiner*—L. T. Hix
*Assistant Examiner*—David M. Gray
*Attorney, Agent, or Firm*—Merchant, Gould, Smith, Edell, Welter & Schmidt

[57] ABSTRACT

A shutter device disposed above a camera, a rack is caused to move up and down by a motor and has a lower end caused to depress the shutter release button of the camera, a conductor is slidably disposed on the rack and a conductor is fixed on the rack, a lever is formed on the rack, and a switch is disposed beside the lever, the conductors are separated when the button is depressed by the rack so that the motor is caused to rotate in a reverse direction and so that the rack is caused to move upward, the motor is stopped when the switch is actuated by the lever.

4 Claims, 6 Drawing Sheets

REMOTE CONTROL SHUTTER DEVICE FOR A CAMERA

BACKGROUND OF THE INVENTION

1. Field of the Invention

The present invention relates to a shutter device, and more particularly to a remote control shutter device for a camera.

2. Description of the Prior Art

The closest prior art of which the applicant is aware is his prior U.S. Pat. No. 4,801,959 (Title: CORDLESS REMOTE CONTROL SHUTTER ACTIVATION DEVICE, filed Nov. 17, 1987).

The present invention has arisen to provide a novel remote control shutter device.

SUMMARY OF THE INVENTION

The primary objective of the present invention is to provide a remote control shutter device which is capable of stopping a motor when a shutter release button of a camera has been depressed with a suitable displacement so that the shutter release button will not be depressed too much.

In accordance with one aspect of the invention, there is provided a shutter device disposed above a camera, a rack is caused to move up and down by a motor and has a lower end caused to depress the shutter release button of the camera, a conductor is slidably disposed on the rack and a conductor is fixed on the rack, a lever is formed on the rack, and a switch is disposed beside the lever, the conductors are separated when the button is depressed by the rack so that the motor is caused to rotate in a reverse direction and so that the rack is caused to move upward, the motor is stopped when the switch is actuated by the lever.

Further objectives and advantages of the present invention will become apparent from a careful reading of the detailed description provided hereinbelow, with appropriate reference to the accompanying drawings.

DETAILED DESCRIPTION OF THE INVENTION

The remote control shutter device of the invention is applicable for depressing the shutter release button of any conventional camera.

Figure 1:
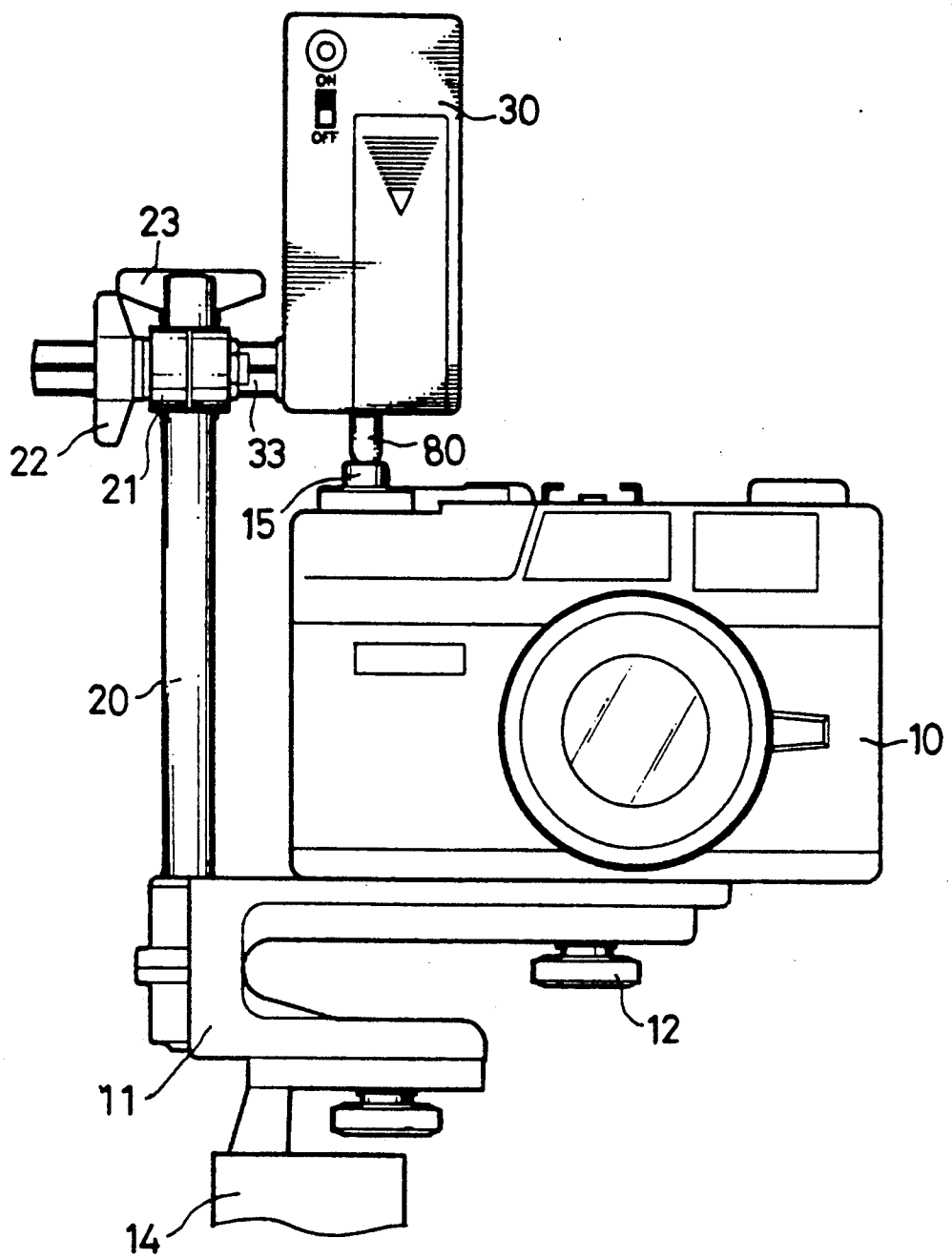
FIG. 1 is a plane view of a remote control shutter device in accordance with the present invention.
Figure 2:
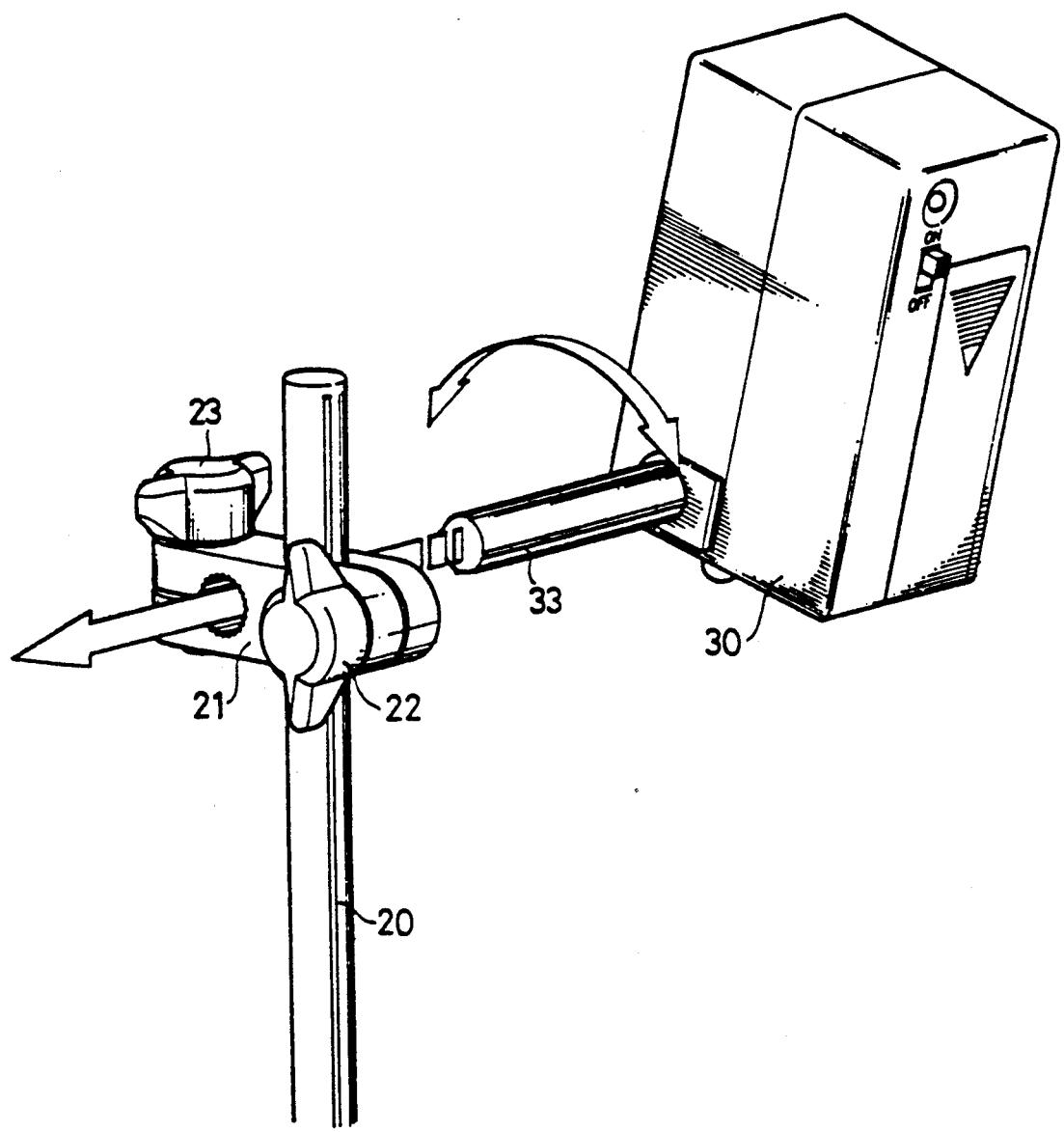
FIG. 2 is a partial perspective view of the remote control shutter device.

Referring to the drawings and initially to FIGS. 1 and 2, the typical camera 10 can be fixed on a seat 11 of a typical tripod 14 by a conventional lock knob 12. The remote control shutter device in accordance with the present invention comprises generally a housing 30 coupled to the seat 11 of the tripod 14 by a support which includes a post 20 and a clamp coupling 21 clamped to the upper portion of the post 20 by a wing screw 22. A shaft 33 laterally extends from the housing 30 and can be clamped in the clamp coupling 21 by a wing screw 23. The clamp coupling 21 is adjustable up and down along the post 20 and is rotatable about the post 20, and the shaft 33 is rotatable about the clamp coupling 21 so that the housing 30 can be adjusted to any desired position.

Figure 3:
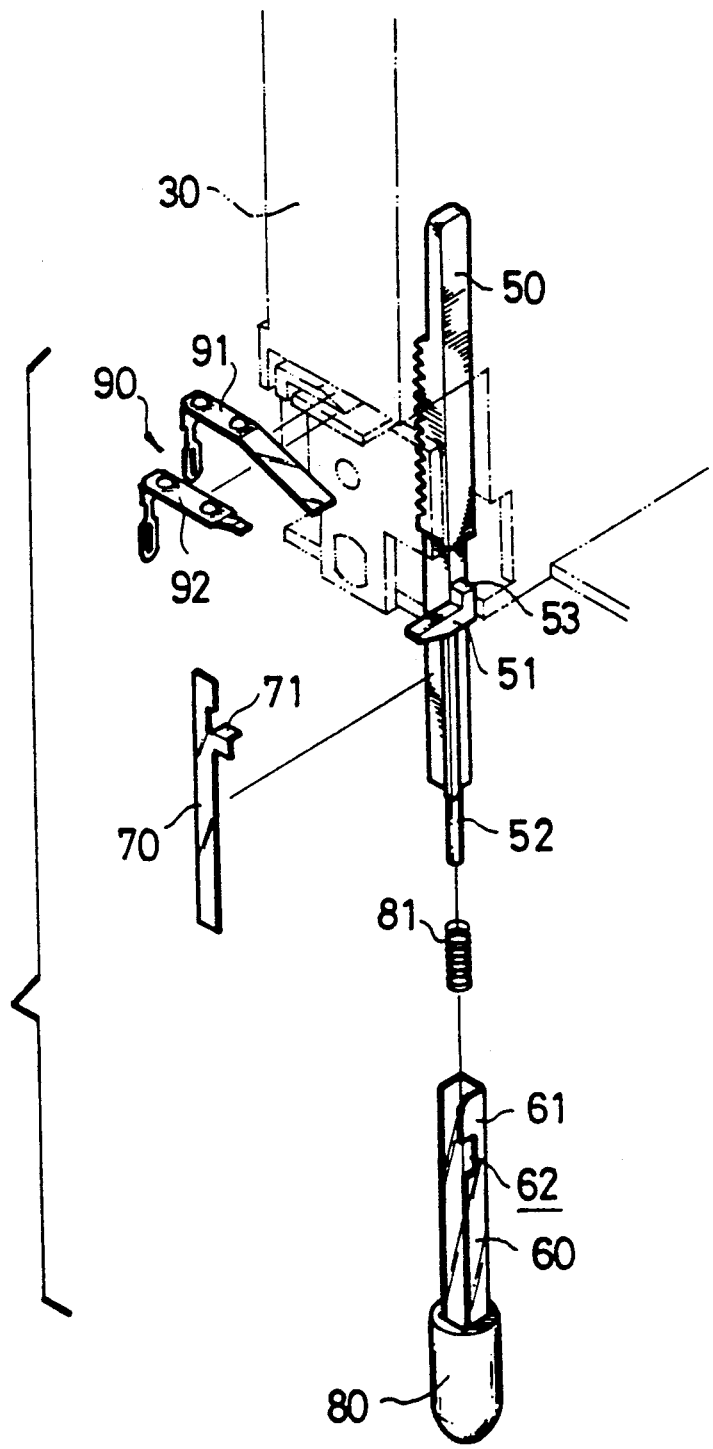
FIG. 3 is a partial exploded view of the remote control shutter device.
Figure 4:
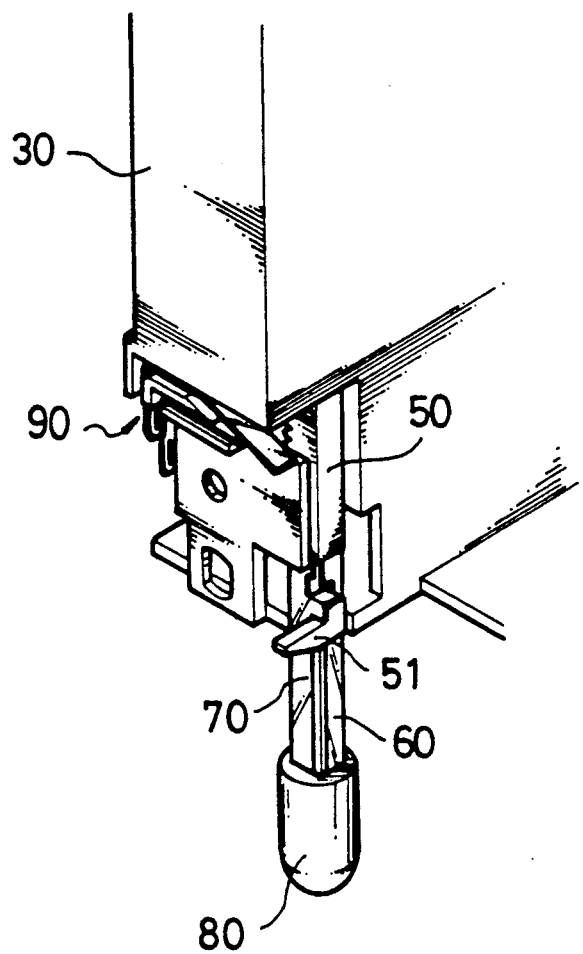
FIG. 4 is a partial perspective view of the remote control shutter device.

Referring next to FIGS. 3 and 4, a motor 40 and a reduction gearing 41 are disposed in the housing 30. The reduction gearing 41 is driven by the motor 40 and includes a pinion 42 engaged with a rack 50 so that the rack 50 can be caused to move up and down by the motor 40. A lever 51 is fixed to the middle portion of the rack 50, and a rod 52 extends downward from the lower end of the rack 50 which is preferably made of insulated materials. A bulge 53 is integrally formed on the upper surface of the rear end of the lever 51. A conductor 70 is fixed to one surface of the rack 50. An L-shaped lug 71 extends from the conductor 70 and is engaged on the bulge 53 of the lever 51. The motor 40 can be energized by such as batteries which can be disposed within the housing 30, and can be activated by a remote control device (not shown) which can be activated by a user. The remote control device is not related to the present invention and will not be described in further details.

A conductor 60 of U-shaped cross section has a notch 62 formed in the upper portion of one side wall thereof so that an ear 61 is formed above the notch 62. A sleeve 80 is force-fitted onto the lower end of the conductor 60 so that the sleeve 80 and the conductor 60 move in concert. A recess 82 is formed in the bottom of the sleeve 80. The conductor 60 is slidably engaged on the lower portion of the rack 50 and one end of the lever 51 is engaged in the notch 62 of the conductor 60. The conductor 60 and the sleeve 80 are movable upward relative to the rack 50 so that the lower end of the rod 52 is extendible into the recess 82 of the sleeve 80. A spring 81 is provided around the rod 52 and is biased between the rack 50 and the bottom of the conductor 60 so that the conductor 60 and the sleeve 80 can be biased downward relative to the rack 50 and so that the ear 61 of the conductor 60 is caused to contact the lug 71 of the conductor 70, as shown in FIG. 5.

The motor 40 can be actuated to rotate in a reverse direction via a suitable circuit (not shown) when the ear 61 of the conductor 60 contacts the lug 71 of the conductor 70 so that the rack 50 can be caused to move upward. A switch 90 includes a longer blade 91 disposed above a shorter blade 92. The blades 91, 92 are resilient. The longer blade 91 is configured such that it can spring downward to contact the shorter blade 92 when no external force is applied thereto, and the longer blade 91 can be pushed upward by the lever 51 when the rack 50 moves upward so that the longer blade 91 can be separated from the shorter blade 92.

Figure 5:
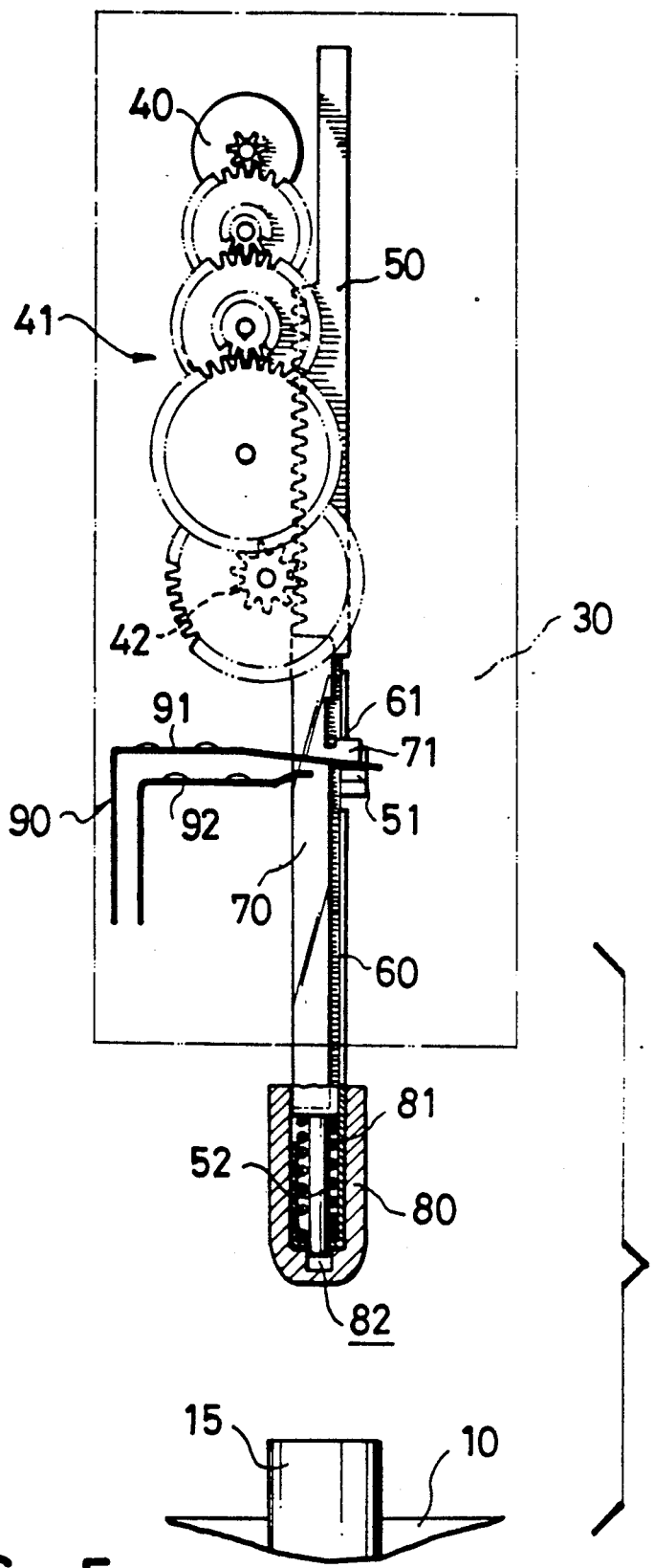
FIGS. 5 and 6 are partial cross sectional views of the remote control shutter device.
Figure 6:
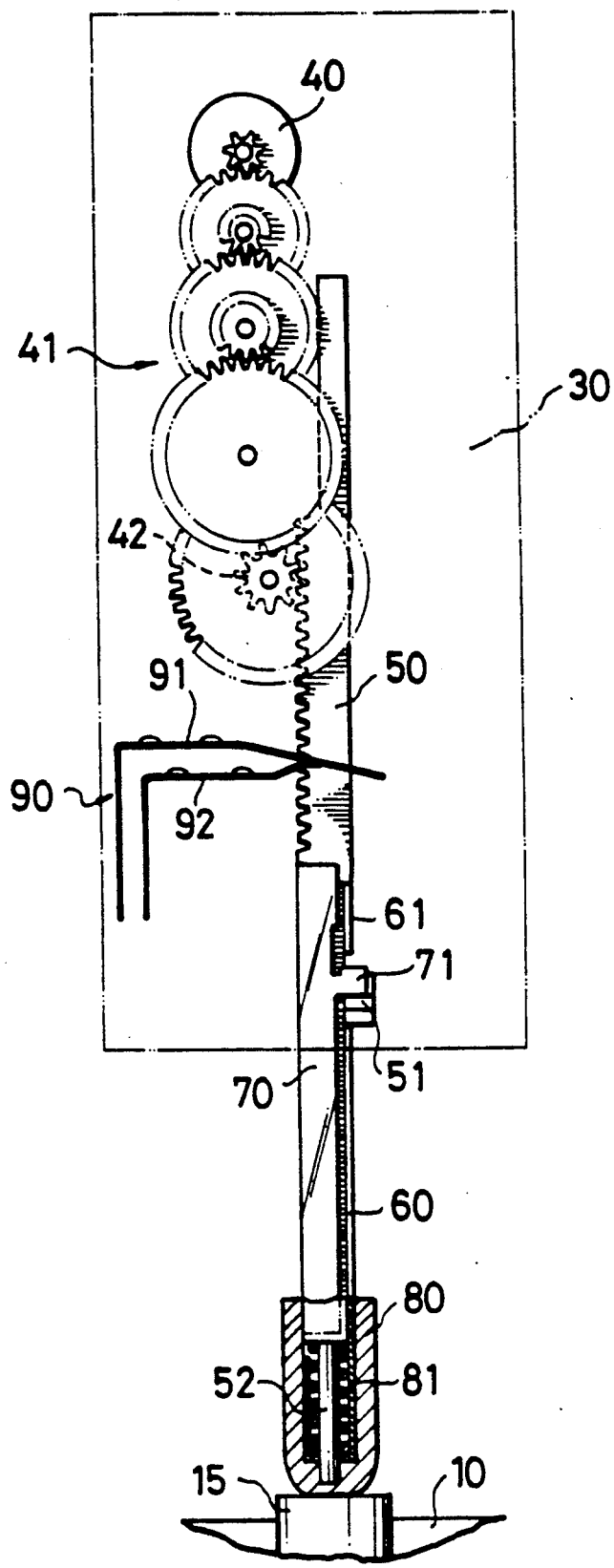

In operation, please refer to FIG. 5, initially, the rack 50 is located in a retracted position, the blades 91, 92 are separated with each other by the lever 51, and the ear 61 of the conductor 60 contacts the lug 71 of the conductor 70. When the motor 40 is activated, the rack 50 will be caused to move downward by the motor 40. The longer blade 91 will spring downward to contact the blade 92 when the lever 51 moves downward. When the shutter release button 15 is depressed downward by the sleeve 80, the conductor 60 and the sleeve 80 are caused to move upward relative to the rack 50 and against the spring 81 so that the ear 61 of the conductor 60 is separated from the lug 71 of the conductor 70. Once the ear 61 is separated from the lug 71, the motor 40 is caused to rotate in a reverse direction so that the rack 50 can be caused to move upward. When the rack 50 moves upward to a suitable position, the longer blade 91 can be pushed upward by the lever 51 so that it can be separated from the short blade 92. Once the blades 91, 92 are separated from each other, the motor 40 is deactivated.

It is to be noted that the operations can be controlled by any suitable circuit, the circuit is not related to this invention and will not be described in details.

Accordingly, the remote control shutter device in accordance with the present invention is capable of stopping a motor when the shutter release button of the camera has been depressed with a suitable displacement so that the shutter release button will not be depressed too much.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A shutter device comprising a housing supported above a camera by a support, a motor and a reduction gearing disposed in said housing, said reduction gearing being engaged with said motor and being driven by said motor, a rack movably disposed in said housing and engaged with said reduction gearing so that said rack can be driven to move up and down by said motor, a lower portion of said rack being extendible downward beyond said housing, a rod integrally formed on said lower portion of said rack and located above a shutter release button of said camera, a lever formed on one side portion of said rack, a first conductor slidably disposed on said lower portion of said rack, a notch formed in an upper portion of said first conductor so that an ear is formed above said notch, a portion of said lever being engaged in said notch, a second conductor fixed on said rack and having a lug extended therefrom, said lug being disposed upon said portion of said lever, a sleeve coupled to a lower end of said first conductor and having a recess formed in a bottom thereof, a lower end of said rod extendible downward beyond said first conductor and extendible into said recess of said sleeve, a spring biased between said rack and said first conductor for biasing said first conductor downward relative to said rack so that said lug of said second conductor is caused to contact with said ear of said first conductor, a switch disposed in said housing and can be actuated by said lever; said sleeve being caused to depress said shutter release button when said rack is driven to move downward by said motor, said first conductor and said sleeve being caused to move upward relative to said rack against said spring when said shutter release button is depressed so that said ear of said first conductor is caused to be separated from said lug of said second conductor, said motor being caused to move in a reverse direction when said ear of said first conductor is separated from said lug of said second conductor so that said rack can be driven to move upward by said motor, and said motor being stopped when said switch is actuated by said lever.

2. A shutter device according to claim 1, wherein said support includes a post fixed on a seat on which said camera disposed, a clamp coupling clamped to said post, and a shaft extended laterally from said housing and coupled to said clamp coupling so that said housing can be supported upon said camera.

3. A shutter device according to claim 1, wherein said switch includes a long blade disposed above a short blade, said long blade is resilient and contacts said short blade when no external force is applied thereto, said motor is stopped when said long blade is pushed upward by said lever.

4. A shutter device according to claim 1, wherein a bulge is formed on said portion of said lever, said bulge is received in said notch of said first conductor, said lug of said second conductor is engaged on said bulge of said lever and is located below said ear of said first conductor, said lug of said second conductor is caused to contact with said ear of said first conductor when said first conductor is caused to move downward relative to said rack by said spring.

* * * * *